(12) United States Patent
Mizutani et al.

(10) Patent No.: US 11,443,878 B2
(45) Date of Patent: Sep. 13, 2022

(54) OPERATION UNIT AND ELECTRONIC APPARATUS

(71) Applicant: CANON KABUSHIKI KAISHA, Tokyo (JP)

(72) Inventors: Shoma Mizutani, Tokyo (JP); Natsu Mikami, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/217,964

(22) Filed: Mar. 30, 2021

(65) Prior Publication Data

US 2021/0319936 A1 Oct. 14, 2021

(30) Foreign Application Priority Data

Apr. 8, 2020 (JP) .............. JP2020-069902

(51) Int. Cl.
| | |
|---|---|
| *H01F 7/02* | (2006.01) |
| *G03B 17/00* | (2021.01) |
| *F16H 1/22* | (2006.01) |
| *G06F 3/0354* | (2013.01) |
| *G06F 3/0362* | (2013.01) |

(52) U.S. Cl.
CPC .............. *H01F 7/02* (2013.01); *F16H 1/227* (2013.01); *G03B 17/00* (2013.01); *G06F 3/0362* (2013.01); *G06F 3/03543* (2013.01)

(58) Field of Classification Search
CPC .......... G03B 17/00; G03B 17/02; H01F 7/02; F16H 1/227; F16H 49/005
USPC ..................................... 324/207.25
See application file for complete search history.

(56) References Cited

U.S. PATENT DOCUMENTS

| | | | |
|---|---|---|---|
| 8,130,123 B2 * | 3/2012 | Inoue ................. | G05G 5/03 345/184 |
| 2018/0239385 A1 * | 8/2018 | Mizukami ............ | H03K 17/97 |
| 2020/0265981 A1 * | 8/2020 | Mizutani ............. | H01F 7/0252 |

FOREIGN PATENT DOCUMENTS

JP 4544323 B2 9/2010

* cited by examiner

*Primary Examiner* — Christopher E Mahoney
(74) *Attorney, Agent, or Firm* — Canon U.S.A., Inc. I.P. Division

(57) ABSTRACT

An operation unit includes an operation member, a gear portion provided on the operation member, a plurality of gears engaged with the gear portion and rotatable, and a plurality of magnets, each of which is provided to a corresponding one of the plurality of gears. The plurality of gears rotate so as to change an attractive force between the magnets, when a user operates the operation member.

12 Claims, 9 Drawing Sheets

OPERATION UNIT AND ELECTRONIC APPARATUS

BACKGROUND

Field of the Disclosure

The present disclosure generally relates to an operation unit and an electronic apparatus including a rotational operation member which a user uses for a rotational operation.

Description of the Related Art

An electronic apparatus, such as a digital camera, can set an imaging condition and select a function by rotating a rotational operation member, such as a dial. The rotational operation member can be an operation member that gives a click feeling when the user operates it. By giving the click feeling, the user can intuitively grasp an operating amount. Conventionally, a structure for giving the click feeling has generally used an elastic member and a cam. This structured operation member generates an operating noise (clack) when a metal ball urged by the elastic member gets over the cam. During imaging in a quiet environment or motion image capturing, the operating noise of the operation member needs to be quiet.

Japanese Patent No. 4544323 discloses a structure that gives the click feeling using an attractive force and a repulsive force between a fixed magnet and a ring-shaped multipole magnet that rotates integrally with a rotational operation member and is multi-pole magnetized in the circumferential direction. This structure is less likely to deteriorate the click feeling, but can quietly provide the click feeling.

The structure disclosed in Japanese Patent No. 4544323 generates the click feeling when a relationship of opposing poles between the multi-pole magnet and the fixed magnet turns from the adsorption to the adsorption again through the repulsion. Therefore, a single click feeling requires a rotation corresponding to two poles of the rotating magnet. This structure needs the multi-pole magnet to have the divided magnet number be twice as many as the click number generated during one rotation of the operation member. As a result, the operation member may be large.

SUMMARY

The present disclosure generally provides for an operation unit including a compact and quietly operable operation member, and an electronic apparatus, each of which can give a good click feeling.

An operation unit according to one aspect of the present disclosure includes an operation member, a gear portion provided on the operation member, a plurality of gears engaged with the gear portion and rotatable, and a plurality of magnets, each of which is provided to a corresponding one of the plurality of gears. The plurality of gears rotate so as to change an attractive force between the magnets, when a user operates the operation member.

An electronic apparatus including the above operation unit also constitutes another aspect of the present disclosure.

Further features of the present disclosure will become apparent from the following description of exemplary embodiments with reference to the attached drawings.

DESCRIPTION OF THE EMBODIMENTS

Figure 1A:
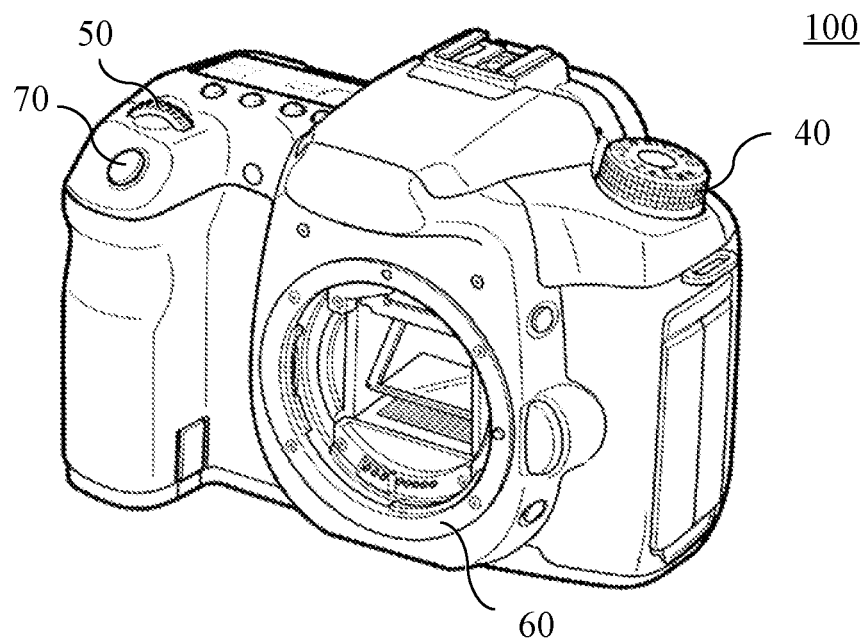
FIGS. 1A and 1B are external perspective views of a digital single-lens reflex camera according to a first embodiment.

Referring now to the accompanying drawings, a detailed description will be given of embodiments according to the present disclosure. Corresponding elements in respective figures will be designated by the same reference numerals, and a duplicate description thereof will be omitted.

First Embodiment

Figure 1B:
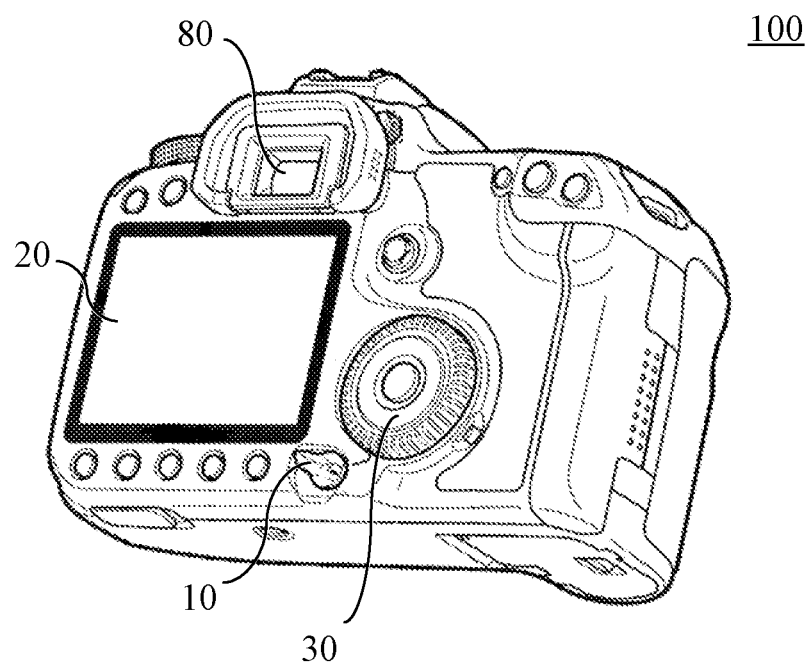

Referring now to FIGS. 1A and 1B, a description will be given of a description of a basic structure of a digital single-lens reflex camera (camera 100) that serves as an electronic apparatus according to a first embodiment of the present disclosure. FIGS. 1A and 1B are external perspective views of the camera 100. FIG. 1A is an external perspective view viewed from the front surface, and FIG. 1B is an external perspective view viewed from the rear surface.

As illustrated in FIG. 1A, the camera 100 includes a shutter button 70 which is a switch for starting imaging. A lens mount portion 60 to which an imaging lens (not shown) can be detachably attached is provided on the front surface of the camera 100. By pressing the shutter button 70, a luminous flux passing through the imaging lens is guided to an image sensor, and an image can be captured.

As illustrated in FIG. 1B, a power switch 10 for starting and stopping supplying the power is provided on the rear surface of the camera 100. The camera 100 includes a removable battery unit (not shown). By turning on the power switch 10, the power is supplied from the battery unit, and the camera 100 starts running. A viewfinder 80 is provided on an upper part of the rear surface of the camera 100, and displays an area to be imaged. A display device 20 provided at the center of the rear surface is a TFT liquid crystal display, an organic EL display, or the like, and can display captured images and various setting items for confirmation.

In addition to various buttons, the camera 100 includes dial operation units such as a sub dial 30, a mode dial 40, and a main dial 50. The dial operation unit is a rotational operation unit that is rotatable clockwise or counterclockwise without contacting anything, and by rotating the dial, various setting values such as an imaging mode, a shutter speed, and a lens aperture value (F-number) can be changed.

Figure 2:
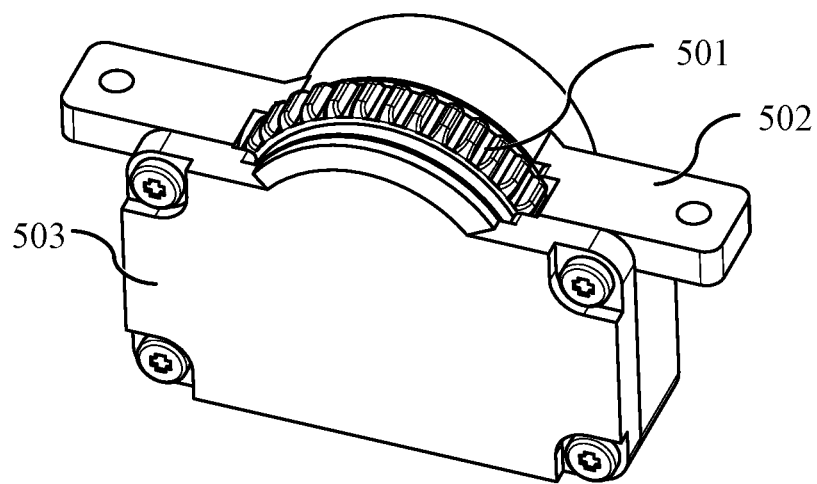
FIG. 2 is a perspective view of a dial operation unit according to the first embodiment.
Figure 3:
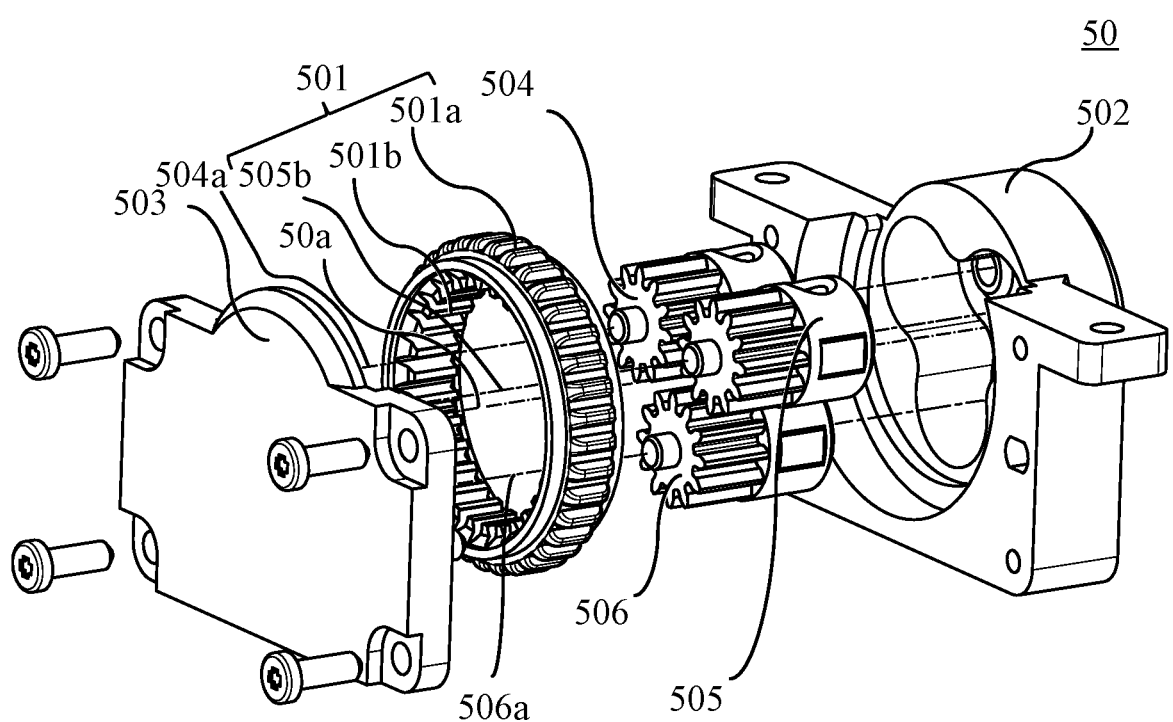
FIG. 3 is an exploded view of the dial operation unit according to the first embodiment.
Figure 4A:
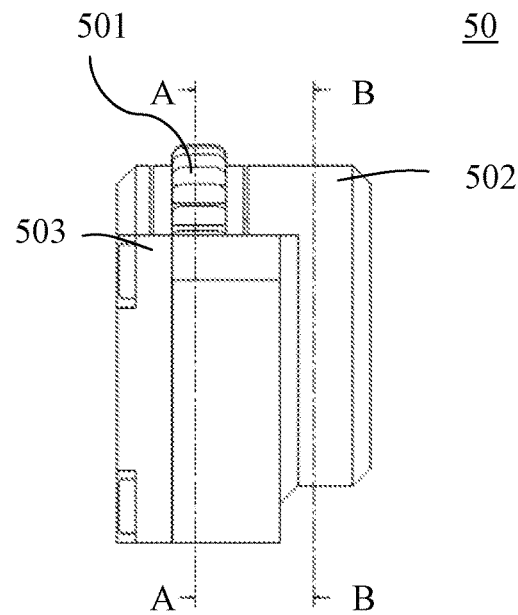
FIGS. 4A and 4B are sectional views of the dial operation unit according to the first embodiment.
Figure 4B:
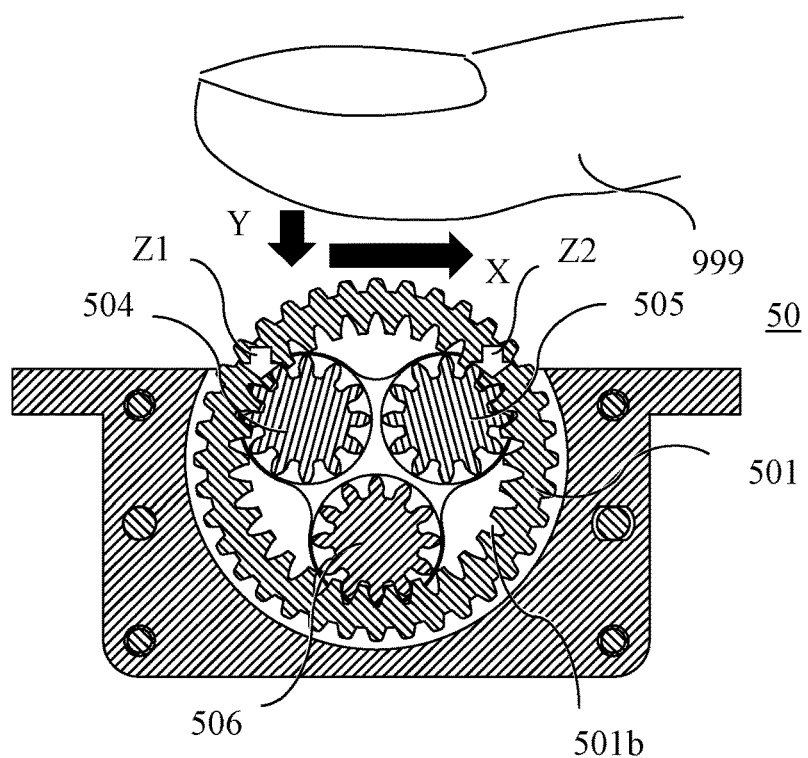

Referring now to FIGS. 2 to 4B, a description will be given of a structure of the dial operation unit according to this embodiment. FIG. 2 is a perspective view of the dial operation unit. FIG. 3 is an exploded view of the dial operation unit. FIGS. 4A and 4B are structural views of the dial operation unit. FIG. 4A illustrates a side view of the dial operation unit, and FIG. 4B illustrates a sectional view taken along a line A-A in FIG. 4A. In this embodiment, the structure of the main dial 50 as the dial operation unit will be discussed as an example, but this embodiment is also applicable to the other dial operation units.

Referring now to FIGS. 2 and 3, a description will be given of an overall structure of the dial operation unit. A dial operation member (rotational operation member) 501 is a dial unit operable by the user, and rotates around a rotation axis 50a. The dial operation member 501 is provided with an uneven portion (uneven or bumpy shape) 501a on the outer periphery thereof so that it can be easily operated with a finger. An internal gear (gear portion) 501b having an internal gear shape is provided on the inner circumference of the dial operation member 501. The dial operation member 501 is rotatably held by a dial base member 502 and a dial cover 503 that serve as fixing members. In addition to the dial operation member 501, the dial base member 502 and the dial cover 503 rotatably hold a plurality of gears of a first pinion 504, a second pinion 505, and a third pinion 506. In this embodiment, the dial operation unit has three gears (pinions), but the present disclosure is not limited to this example as long as the dial operation unit has at least two pinions. The number of pinions is properly variable according to the size of the dial operation unit and the number of clicks. In this embodiment, the first pinion 504, the second pinion 505, and the third pinion 506 all have the same number of teeth (cogs) and the same shapes, but may have different numbers of teeth and shapes.

As illustrated in FIG. 4B, the first pinion 504, the second pinion 505, and the third pinion 506 are respectively arranged so as to be engaged with the internal gear 501b of the dial operation member 501, and rotate in synchronization with the dial operation member 501. The first pinion 504, the second pinion 505, and the third pinion 506 are not engaged with each other. The number of teeth of the internal gear 501b is an integral multiple of the number of pinions. For example, since this embodiment uses three pinions, the number of teeth of the internal gear 501b is 30, which is a multiple of 3. Thereby, even when the first pinion 504, the second pinion 505, and the third pinion 506 can be made with the same shape, they can be arranged in the same phase when engaged with the internal gear 501b. Therefore, the magnetizing directions can be aligned to generate a stable adsorption force. Since the first pinion 504, the second pinion 505, and the third pinion 506 can be produced in the same shape, the cost reduction due to the mass production can be expected.

The user operates the dial operation member 501 by pressing the uneven portion 501a of the dial operation member 501 in the Y direction with his finger 999 and then by sliding it in the X direction (rotating direction) as illustrated in FIG. 4B, so as to rotate the dial operation unit. At this time, the sliding operation is absorbed by rotations, but the load in the Y direction is applied to the tooth surfaces of the first pinion 504 and the second pinion 505 via the internal gear 501b as in Z1 and Z2 directions.

In this embodiment, among the plurality of pinions, the number of pinions arranged at first positions near the user-operated position of the dial operation member 501 is more than the number of pinions placed in second position(s) farther from the user-operated position than the first positions. More specifically, two of the three pinions (first pinion 504 and second pinion 505) are arranged in the first positions and one pinion (third pinion 506) is located in the second position. By arranging the majority of the pinions (the first pinion 504 and the second pinion 505) on the pressing side of the finger 999 in this way, the load can be effectively distributed, and the durability of the gear box during the operation can be improved.

Figure 5A:
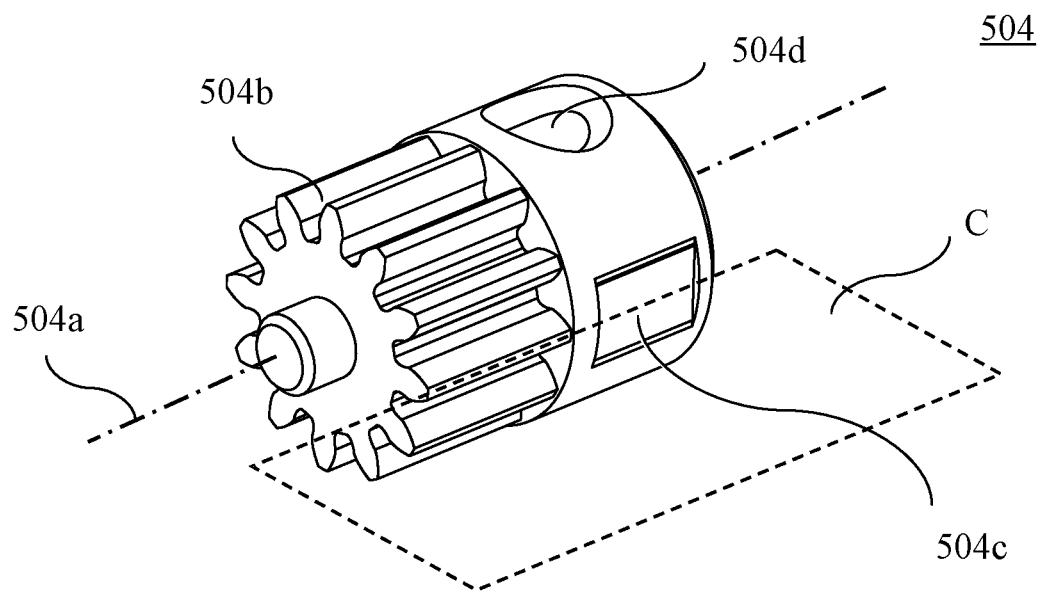
FIGS. 5A and 5B are structural diagrams of a first pinion according to the first embodiment.
Figure 5B:
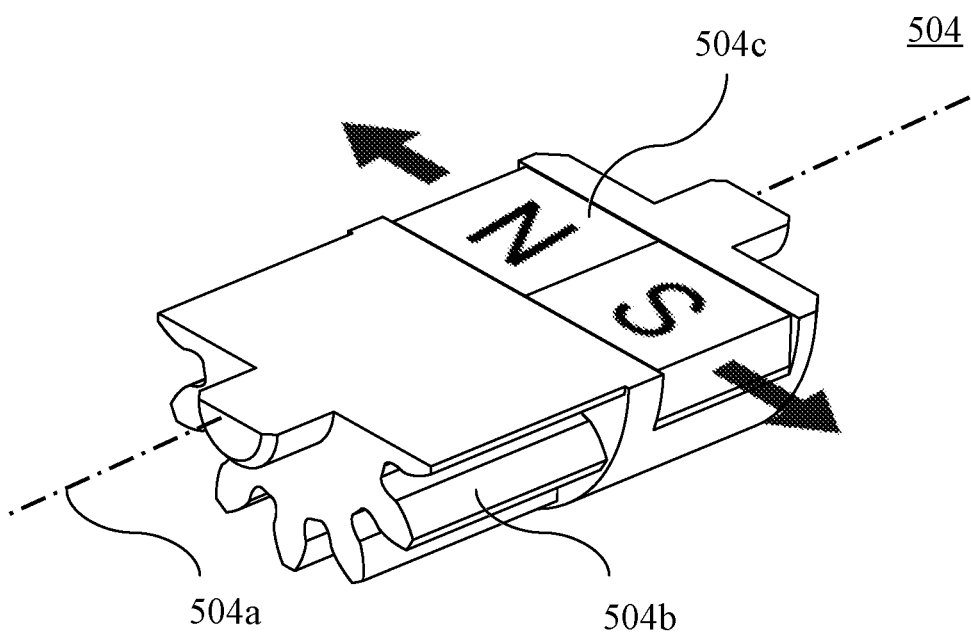

Referring now to FIGS. 5A and 5B, a description will be given of the structure of the first pinion 504. FIGS. 5A and 5B are structural diagrams of the first pinion 504. FIG. 5A is a perspective view of the first pinion 504, and FIG. 5B is a sectional view of the first pinion 504 cut on a C surface in FIG. 5A. Since the second pinion 505 and the third pinion 506 have the same configuration as the first pinion 504, a description thereof will be omitted.

As illustrated in FIG. 5A, the first pinion 504 includes a gear portion 504b and a magnet 504c, and rotates around a rotation axis 504a. The magnet 504c has magnetic poles in the direction perpendicular to the rotation axis 504a, as illustrated in FIG. 5B. After the magnet 504c is inserted into the first pinion 504, the magnet 504c is adhered to the first pinion 504 by pouring an adhesive into an adhesive hole 504d. The method of fixing the magnet 504c is not limited to the adhesion, and for example, the first pinion 504 and the magnet 504c may be integrally molded. The number of teeth of the gear portion 504b can be freely set within a range that does not interfere with other pinions.

Figure 6:
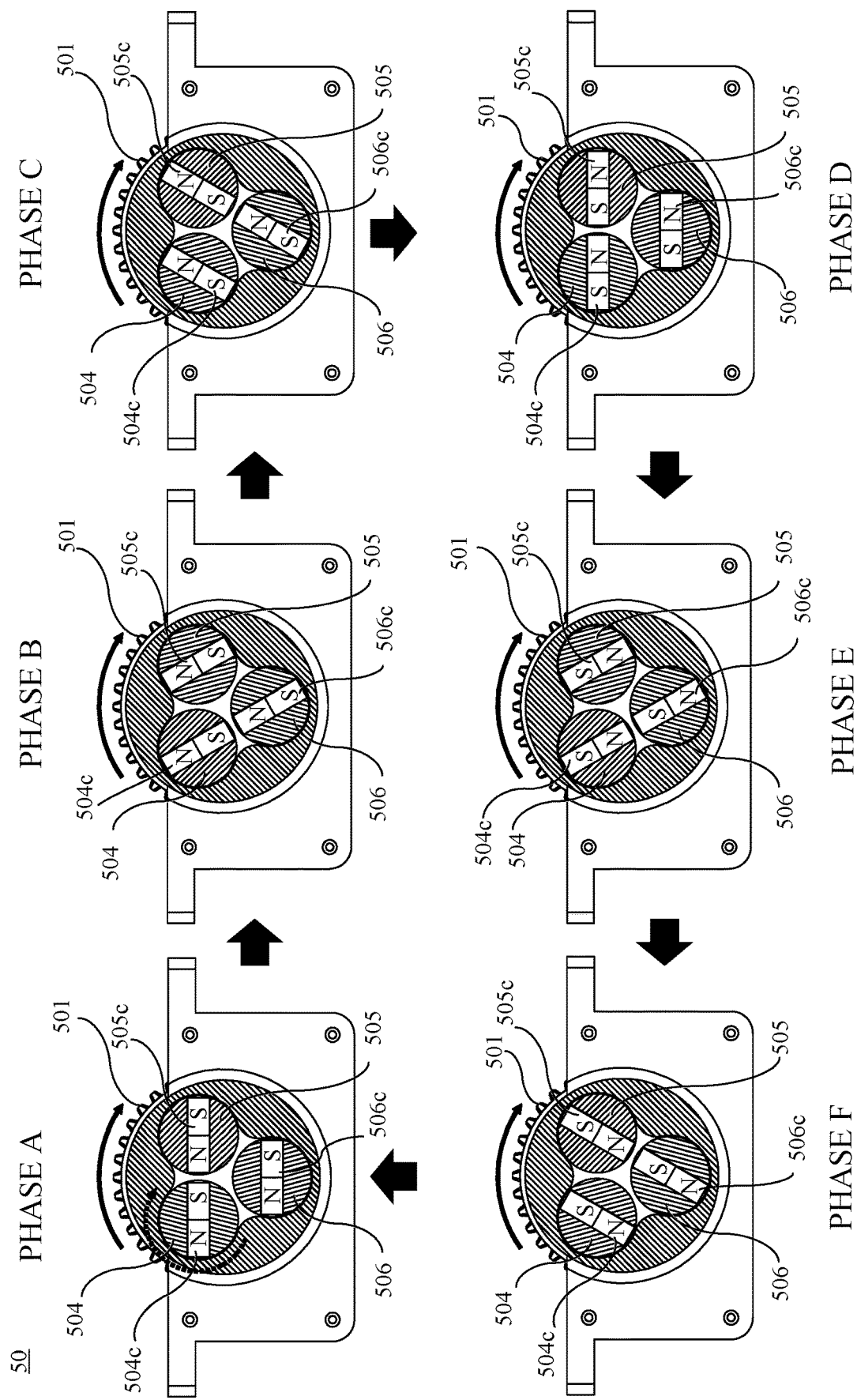
FIG. 6 is a sectional view of each phase of the dial operation unit according to the first embodiment.

Referring now to FIG. 6, a description will be given of an operation of the dial operation unit (main dial 50) according to this embodiment. FIG. 6 is a sectional view of each phase of the dial operation unit (main dial 50), and corresponds to a sectional view taken along a line B-B in FIG. 4A. FIG. 6 divides the state (rotational position) of the main dial 50 into six phases (Phase A to Phase F), and illustrates the states of the magnetic poles of the first pinion 504 to the third pinion 506 in each phase. By rotating the dial operation unit from Phase A to Phase F and then again to Phase A, the first pinion 504, the second pinion 505, and the third pinion 506 each make one rotation.

The phase in the initial state will be called Phase A. In Phase A, the S pole of the magnet 504c provided on the first pinion 504 and the N pole of the magnet 505c provided on the second pinion 505 are attracted to each other. Thereby, the first pinion 504 and the second pinion 505 do not rotate freely, and a force that retains the current phase is generated. Since each pinion is engaged with the internal gear 501b provided on the dial operation member 501, a force that keeps the current phase also acts on the dial operation member 501, and the phase of the dial operation member 501 is retained. In Phase A, the magnet 506c of the third pinion 506 is not close to the magnet 504c and the magnet 505c, and no significant force is exerted.

In Phase A, the main dial 50 is rotated by operating the dial operation member 501 with a force equal to or larger than the attractive force generated between the magnet 504c and the magnet 505c. For example, a rotational operation in the CW direction (clockwise direction) also rotates the first pinion 504, the second pinion 505, and the third pinion 506 in the same direction (CW direction) due to the engagement of the gears, and the phase shifts from Phase A to Phase B. In Phase B, the S pole of the magnet 504c and the N pole of the magnet 506c are attracted to each other, so that a retention force that retains the current phase is generated as in Phase A.

Similarly, as the rotational operation of the dial operation member 501 goes on, the phase changes in order of Phase C, Phase D, . . . . In Phase C, the S pole of the magnet 505c and the N pole of the magnet 506c are attracted to each other. In Phase D, the N pole of the magnet 504c and the S pole of the magnet 505c are attracted to each other. In Phase E, the N pole of the magnet 504c and the S pole of the magnet 506c are attracted to each other. In Phase F, the N pole of the magnet 505c and the S pole of the magnet 506c are attracted to each other.

As illustrated in FIG. 6, in this embodiment, the first pinion 504, the second pinion 505, and the third pinion 506 rotate so that the directions of the magnetic poles of the magnets 504c, 505c, and 506c are parallel to each other (in all phases).

Figure 7:
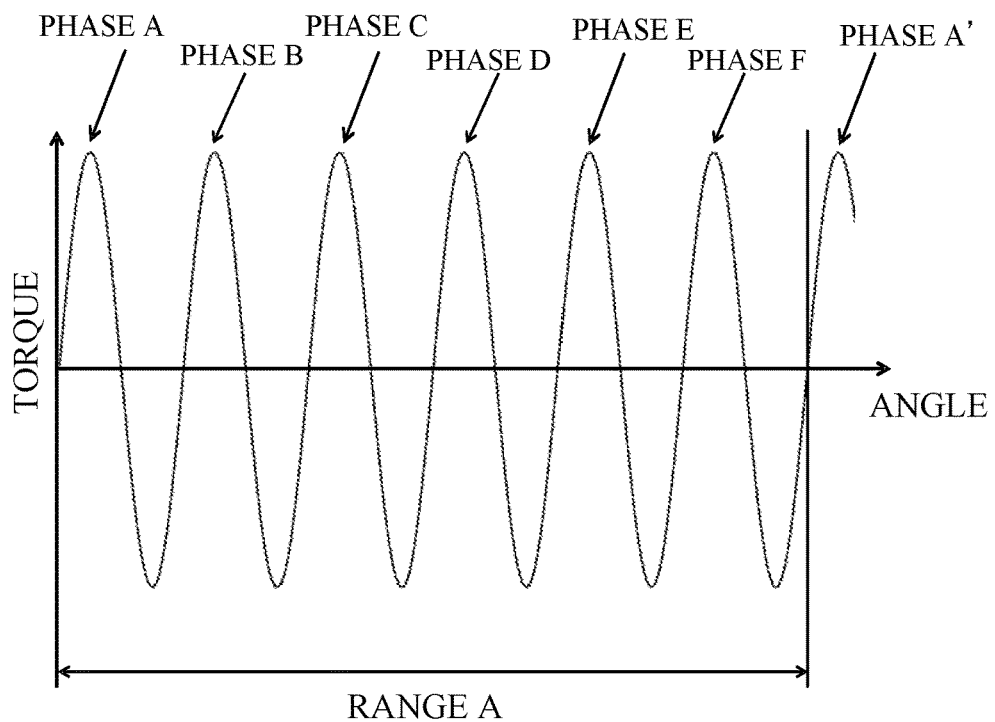
FIG. 7 is an explanatory diagram of a change in operating torque of the dial operation unit according to the first embodiment.

Referring now to FIG. 7, a description will be given of a relationship between the rotational torque (operating torque) and the angle of the dial operation member 501 during the operation. FIG. 7 explains a change in the operating torque of the dial operation unit. In FIG. 7, an abscissa axis represents an angle, and an ordinate axis represents a torque (rotational torque, operating torque).

In each phase, the magnets attract each other and generate a retention force that retains the current phase, so that a discrete resistance is generated during the rotational operation. For example, when the phase shifts from Phase A to Phase B, the attractive force of the magnet 504c and the magnet 505c weakens, and as the attractive force of the magnet 504c and the magnet 506c becomes stronger, the retention force in Phase A attenuates and the shifting force to Phase B becomes stronger. Part where a negative value is generated in the torque in FIG. 7 represents the shifting force. The alternating retention and shifting changes the operating force and produces a good click feeling.

Range A in FIG. 7 represents an angular range per rotation of the pinion, and since the phase shifts from Phase A to Phase F, the click feeling occurs 6 times. Where a reduction ratio N is a rotation speed of each of the first pinion 504, the second pinion 505, and the third pinion 506 when the internal gear 501b makes one rotation, the number of clicks on the dial operation unit is expressed as follows:

Number of clicks on the dial operation unit=(number of clicks per rotation of the pinion)×(reduction ratio $N$)

In this embodiment, the internal gear 501b has 30 teeth, the first pinion 504, the second pinion 505, and the third pinion 506 each have 12 teeth. Therefore, the reduction ratio N is calculated as follows.

Reduction ratio $N=30/12=2.5$

In this embodiment, the number of clicks per rotation of the main dial 50 is 6×2.5=15. As described above, in order to increase the number of clicks in order to improve the operability, it is important to increase the number of clicks per rotation of the pinion and to set the reduction ratio to be small. In this embodiment, the rotating axes 504a, 505a, and 506a of the plurality of pinions (first pinion 504, second pinion 505, and third pinion 506) are arranged rotationally symmetrically with respect to the rotation axes 50a of the dial operation member 501. This arrangement can make a distance between two of the plurality of pinions equal to each other and can provide six clicks, which is equal to or larger than the number of pinions. An embodiment that has a different number of pinions will be described later in a second embodiment.

Figure 8:
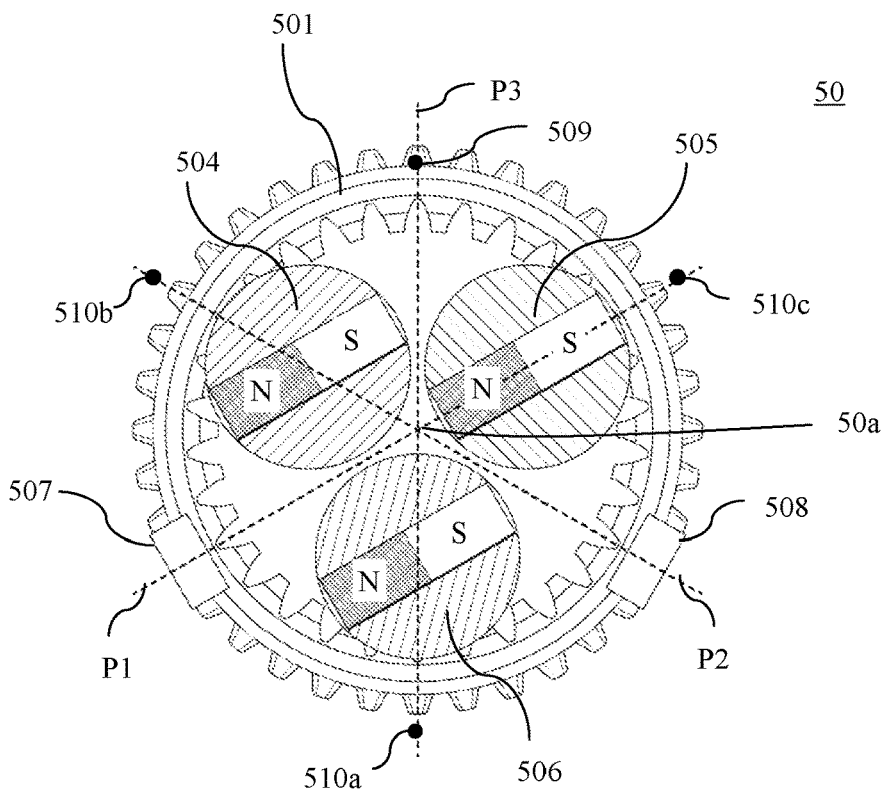
FIG. 8 explains an arrangement of detection members in the first embodiment.

Referring now to FIG. 8, a description will be given of a detector that detects the operation direction and the operating amount when the user operates the dial operation member 501. FIG. 8 explains the arrangement of the detectors in the dial operation unit (main dial 50), and corresponds to the sectional view taken along the line B-B in FIG. 4A. FIG. 8 illustrates a state in which the pinions are rotated by 30 degrees clockwise from the state of Phase F in FIG. 6 (or a state in which the pinions are rotated by 30 degrees counterclockwise from the state of Phase A). Broken lines P1, P2, and P3 indicate planes (or lines made by projecting these planes) passing through the rotation axis 50a of the main dial 50, and the first pinion 504, the second pinion 505, and the third pinion 506 are arranged so as to be plane-symmetric with respect to the planes P1, P2, and P3.

This embodiment provides a first detection member 507 and a second detection member 508 as the detectors for detecting the operating direction and operating amount of the dial operation member 501. The first detection member 507 and the second detection member 508 are Hall elements. The first detection member 507 is disposed on the plane P1 and can detect the magnetic flux density in the P1 direction. The second detection member 508 is disposed on the plane P2 and can detect the magnetic flux density in the P2 direction.

Figure 9:
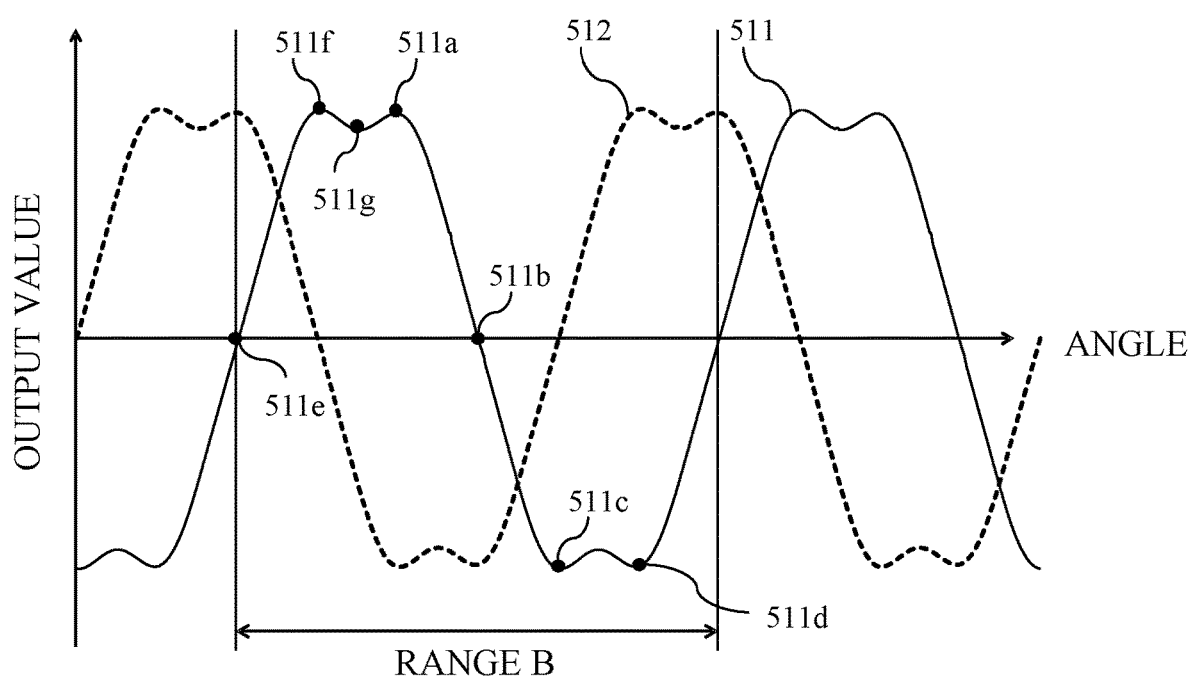
FIG. 9 illustrates waveforms detected by the detection members in the first embodiment.

Referring now to FIG. 9, a description will be given of output waveforms detected by the first detection member 507 and the second detection member 508. FIG. 9 illustrates the detection waveforms by the first detection member 507 and the second detection member 508 when the dial operation member 501 is rotated in the clockwise direction (CW direction). In FIG. 9, the abscissa axis indicates the rotation angle of the pinion (dial operation member 501), and Range B corresponds to a range corresponding to one rotation of the pinion. The ordinate axis shows the output values (for example, the voltage value according to the magnetic flux density) of the first detection member 507 and the second detection member 508. A waveform 511 illustrated by a solid line in FIG. 9 shows the output waveform of the first detection member 507, and a waveform 512 illustrated by a broken line shows the output waveform of the second detection member 508. The output values of the first detection member 507 in the six states from Phase A to Phase F illustrated in FIG. 6 correspond to points 511a to 511f in FIG. 9, respectively. The output value of the first detection member 507 in the state illustrated in FIG. 8 corresponds to a point 511g in FIG. 9. The second detection member 508 is disposed at a position rotated by 120 degrees relative to the first detection member 507 around the rotation axis 50a of the dial operation member 501 as the central axis. Therefore, the waveform 512 has the same shape as that of the waveform 511 with a phase shift of 120 degrees in terms of the rotation angle of the pinion.

When the two detection members (first detection member 507 and second detection member 508) are arranged as illustrated in FIG. 8, two waveforms having the same shapes and a phase shift as illustrated in FIG. 9 can be obtained. Then, the rotation direction of the pinion, that is, the rotation direction of the main dial 50 (dial operation member 501) can be detected based on the phase shift of the two waveforms. The rotating amount of the pinion (dial operation member 501) can be detected based on the waveforms 511 and 512 (analog outputs).

Since the detection members are affected by the magnetic fields formed by all the magnets of the three pinions, if they are disposed at positions other than the planes P1, P2, and P3 in FIG. 8, the output waveforms of the detection members becomes non-uniform and the detection timing may shift depending on the rotation direction of the dial operation member 501. Therefore, this embodiment may arrange the first detection member 507 and the second detection member 508 at positions rotationally symmetrical with respect to the rotation axis 50a on the planes P1, P2, and P3 which are symmetrical planes. In this embodiment, the main dial 50 is arranged at the positions of the first detection member 507 and the second detection member 508 illustrated in FIG. 8 so as to be easily arranged in terms of space. However, this embodiment is not limited to this example, and they may be arranged at different positions as long as they are arranged rotationally symmetrically with respect to the rotation axis 50a of the dial operation member 501 and placed on planes P1, P2, and P3 (on planes in which the arrangement of the plurality of gears is plane-symmetrical). For example, a waveform with good symmetry can be detected even if they are arranged at points 510a, 510b, and 510c in FIG. 8.

The noncontact detection of the rotation using the Hall element can make quieter the operating noise during the operation of the main dial 50 than the detecting structure involving the contact (such as the detection of the rotation using the metal pattern and the metal armature brush). Thereby, even when the main dial 50 is operated to change various setting values during motion image capturing, the operating noise is not included in the movie. Even in imaging in a quiet space such as a concert hall, the user can operate the camera without worrying about the operating noise. In addition, the noncontact can expect the improved durability.

Another conceivable noncontact detecting method of the rotation includes one using a rotary encoder, but the detection of the rotation using the magnet in the pinion to generate the click feeling can reduce the cost more effectively than a method that provides a new detection mechanism.

Second Embodiment

Next follows a description of a dial operation unit (main dial 250) that serves as the operation unit according to a second embodiment of the present disclosure. The structure of the camera other than the main dial 250 is the same as that of the camera 100 in the first embodiment. This embodiment is applicable to dial operation units other than the main dial 250.

Figure 10:
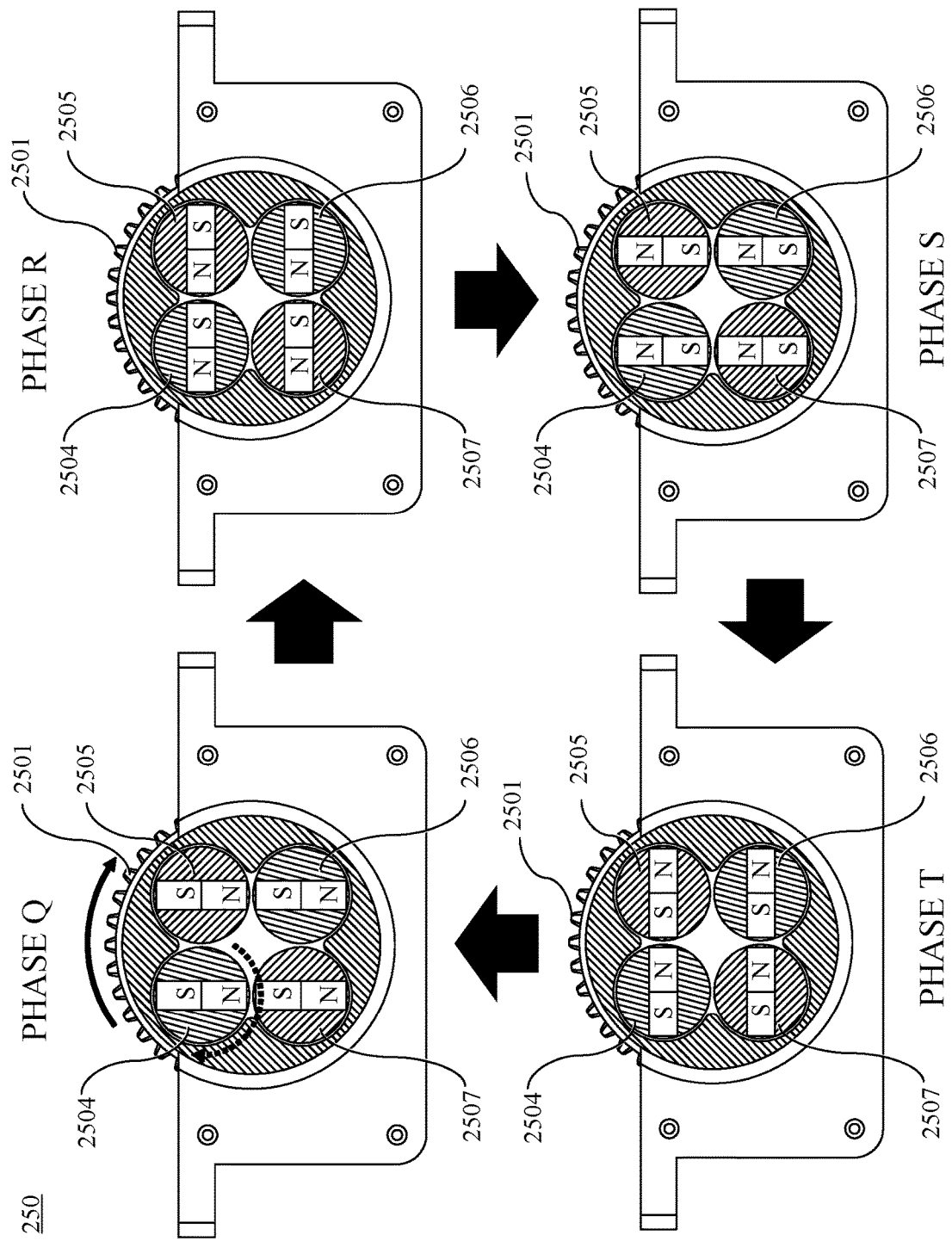
FIG. 10 is a sectional view of each phase of a dial operation unit according to a second embodiment.

The operation of the dial operation unit (main dial 250) according to this embodiment will be described with reference to FIG. 10. FIG. 10 is a sectional view (sectional view in a plane perpendicular to the rotation axis) of each phase of the dial operation unit (main dial 250).

As illustrated in FIG. 10, the main dial 250 includes four pinions: a first pinion 2504, a second pinion 2505, a third pinion 2506, and a fourth pinion 2507. FIG. 10 illustrates rotating states of the main dial 250 divided into four phases (Phase Q to Phase T), and the directions of the magnets in the pinions (directions of magnetic poles) in each phase. By shifting the phase to Phase Q again through Phase Q to Phase T, each of the four pinions makes one rotation.

In Phase Q, the N pole of the magnet provided on the first pinion 2504 and the S pole of the magnet provided on the fourth pinion 2507 are attracted to each other. At the same time, the N pole of the magnet provided on the second pinion 2505 and the S pole of the third pinion 2506 are attracted to each other. Thereby, the four pinions from the first pinion 2504 to the fourth pinion 2507 do not freely rotate, and forces for retaining the current phase are generated. Since each pinion is engaged with the internal gear provided on the dial operation member (rotational operation member) 2501, a force that retains the current phase also acts on the dial operation member 2501, and the phase of the dial operation member 2501 is retained.

In Phase Q, when the main dial 250 is operated with a force larger than a resultant force of the attractive force acting between the first pinion 2504 and the fourth pinion 2507 and the attractive force acting between the second pinion 2505 and the third pinion 2506, the main dial 250 rotates. For example, the rotational operation in the clockwise direction (CW direction) also rotates the four pinions in the same direction (CW direction) due to the gear engagements, and the phase shifts from Phase Q to Phase R. In Phase R, the S pole of the magnet of the first pinion 2504 and the N pole of the magnet of the second pinion 2505 are attracted to each other. At the same time, the N pole of the magnet of the third pinion 2506 and the S pole of the magnet of the fourth pinion 2507 are attracted to each other. Thereby, similar to Phase Q, a retention force for retaining the current phase is generated on the dial operation member 2501.

Similarly, as the rotational operation goes on, the phase changes in order of Phase S and Phase T. In each phase, attractive forces occur between the magnets of two sets of pinions facing each other. Since the phase shifts from Phase Q to Phase T for each rotation of the pinion, four clicks occur when each pinion makes one rotation. The number of clicks generated during one rotation of each pinion is smaller than that of the first embodiment that has three pinions, but a stronger click feeling for each click is available because the attractive forces are made by the two sets of magnets.

When five or more pinions are provided, a click feeling can be similarly generated by arranging the pinions rotationally symmetrically with respect to the rotation axis of the dial operation member. However, the number of clicks generated for four or more pinions is the same as the number of pinions. When the number of pinions is four or more and even, totally two sets of pinions generate the attractive forces, because in addition to a set of pinions for generating the attractive force, another pair of pinions located at positions that are twice symmetric with respect to the rotation axis of the dial (point symmetry when viewed in a section perpendicular to the rotation axis) generate the attractive force. Therefore, the click force for each click can become stronger than that where the number of pinions is four or more and odd.

Third Embodiment

Figure 11:
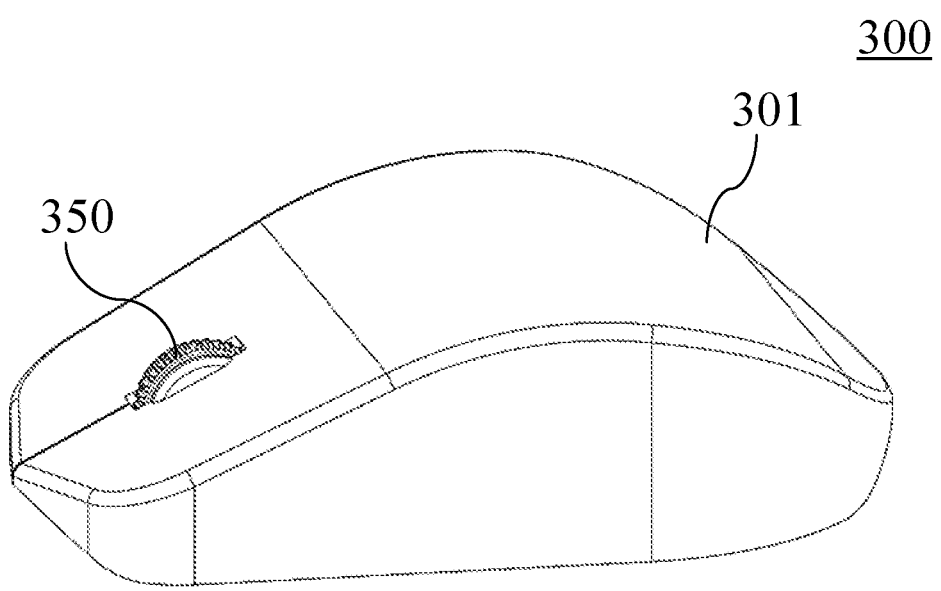
FIG. 11 is a perspective view of a mouse in a third embodiment.

Referring now to FIG. 11, a description will be given of a third embodiment according to the present disclosure. This embodiment relates to a mouse wheel used for a computer operation. FIG. 11 is a perspective view of a mouse 300 according to this embodiment.

As illustrated in FIG. 11, the mouse 300 has a wheel (operation unit) 350 that is partially exposed from a main body 301, and operable by the user. The wheel 350 is structured similarly to the main dial 50 described in the first embodiment. By operating the wheel 350 with the index finger, the user adjusts parameters, scrolls, enlarges and reduces a display magnification, and the like in a computer application.

The click feeling is important as a feedback to the user in operations that require an accurate operating amount such as a parameter adjustment. In addition, for a portable small mouse, the wheel 350 itself is also required to be small. Since the wheel 350 is one of the operation units (rotational operation units) that are frequently operated in the computer operation, a larger number of clicks for one rotation of the wheel 350 can reduce the operating burden of the user because a required rotating amount becomes smaller.

For an operation that requires a rotating amount that is long to some extent such as scrolling a long document, the operating noise generated when the wheel 350 is operated is demanded to be quiet. In addition, the durability is also demanded. Since the wheel 350 according to this embodiment can give a good click feeling, and is a compact and quietly operable operation member, the above demanded functions can be satisfied.

As described above, in each embodiment, the operation unit includes an operation member (dial operation member), a gear portion (internal gear) provided on the operation member, a plurality of gears (pinons) engaged with the gear portion and rotatable, and a plurality of magnets provided to the plurality of gears. The plurality of gears rotate so that an attractive force between the magnets changes according to the operation of the operation member by the user. The plurality of gears may rotate so as to change the attractive force from a first attractive force to a second attractive force smaller than the first attractive force.

Each embodiment can provide an operation unit and an electronic apparatus, each of which can give a good click feeling and includes a compact and quietly operable operation member.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2020-069902, filed on Apr. 8, 2020, which is hereby incorporated by reference herein in its entirety.

What is claimed is:

1. An operation unit comprising:
   an operation member;
   a gear portion provided on the operation member;
   a plurality of gears engaged with the gear portion and rotatable; and
   a plurality of magnets, each of which is provided to a corresponding one of the plurality of gears,
   wherein the plurality of gears rotate, so as to change an attractive force between the magnets, when a user operates the operation member, and
   wherein the gear portion has an internal gear shape disposed on an inner circumference of the operation member.

2. The operation unit according to claim 1, wherein the plurality of gears rotate so as to change the attractive force from a first attractive force to a second attractive force smaller than the first attractive force.

3. The operation unit according to claim 1, wherein the plurality of gears are not engaged with each other.

4. The operation unit according to claim 1, wherein the operation member is a rotational operation member that is rotatably held by a fixed portion.

5. The operation unit according to claim 1, wherein among the plurality of gears, the number of gears located at first positions near an operated position of the operation member is more than the number of gears located at a second position or second positions farther from the operated position than the first positions.

6. The operation unit according to claim 1, wherein rotation axes of the plurality of gears are arranged rotationally symmetrically with respect to a rotation axis of the operation member.

7. The operation unit according to claim 1, wherein the number of teeth of the gear portion of the operation member is an integral multiple of the number of gears.

8. The operation unit according to claim 1, wherein the number of gears is three.

9. The operation unit according to claim 1, further comprising a plurality of detection members,
   wherein the plurality of detection members are arranged on a plane in which the plurality of gears are plane-symmetrically arranged, and at positions rotationally symmetrical with respect to a rotation axis of the operation member.

10. An electronic apparatus comprising the operation unit according to claim 1.

11. An operation unit comprising:
    an operation member;
    a gear portion provided on the operation member;
    a plurality of gears engaged with the gear portion and rotatable; and
    a plurality of magnets, each of which is provided to a corresponding one of the plurality of gears,
    wherein the plurality of gears rotate, so as to change an attractive force between the magnets, when a user operates the operation member, and
    wherein the plurality of gears rotate so that directions of magnetic poles of the plurality of magnets are parallel to each other.

12. An electronic apparatus comprising the operation unit according to claim 11.

* * * * *